Patented Jan. 11, 1944

2,338,798

UNITED STATES PATENT OFFICE 2,338,798

TERPENE COMPOUND

Joseph N. Borglin, Wilmington, Del., assignor to Hercules Powder Company, Wilmington, Del., a a corporation of Delaware No Drawing. Application May 14, 1941, Serial No. 393,377

20 Claims. (Cl. 260—563)

This invention relates to new terpene compounds and to a method for their preparation. More particularly, it relates to new hydroxyl-containing terpene amines and to a method for their preparation.

In accordance with this invention an unsaturated terpene is brought into intimate contact with ammonia and with oxygen and reacted therewith until a hydroxyl-containing terpene amine is formed. This reaction may be conducted under pressure if desired, and it may be facilitated by the aid of catalysts. The ammonia may be in a substantially anhydrous or aqueous form. By the reaction in accordance with this invention, there is formed a mixture of oily water-insoluble hydroxyl-containing terpene amines and water-soluble hydroxyl-containing terpene amines. Both types of product are characterized by a content of amino-nitrogen and by hydroxyl groups which may be on both secondary and tertiary carbon atoms of the terpenic portion of the molecule. The two types of product mentioned may be separated and recovered from the reaction mixture.

The terpene utilized in the method according to this invention will be an unsaturated terpene which will be either of a substituted or unsubstituted nature. The term "terpene" as used herein and in the claims is used in its broader sense, and includes both terpene hydrocarbons and derivatives thereof, which may be considered as terpene hydrocarbons which have been modified by substitution or addition thereto of elements, or groups containing elements, such as oxygen, sulfur, nitrogen, halogens, etc. Suitable unsaturated terpenes which may be utilized are such unsaturated terpene hydrocarbons as, for example, alpha-pinene, beta-pinene, dipentene, terpinene, terpinolene, alloocimene, ocimene, alpha-pyronene, beta-pyronene, myrcene, philandrene, fenchene, sesquiterpenes, and the like; such unsaturated terpene alcohols as alpha-terpineol, beta-terpineol, gamma-terpineol, terpinenol, and the like; and such unsaturated terpene esters as alpha-terpinyl acetate, alpha-terpinyl formate, beta-terpinyl acetate, beta-terpinyl formate, terpinenol propionate, and the like; and such unsaturated terpene ethers as terpinyl methyl ether, terpinyl ethyl ether, terpinyl glycol ether, and the like. Unsaturated polyterpenes are also suitable.

The oxygen required for the reaction in accordance with this invention may be provided in the form of a gas or other fluid containing free oxygen. Pure oxygen may be utilized, if desired, but for most purposes the oxygen is conveniently provided in the form of ordinary air. Oxygen may also be provided in the form of a compound capable of readily forming free or nascent oxygen. Such compounds as, for example, hydrogen peroxide, sodium peroxide, barium peroxide, sodium perborate, potassium persulphate, potassium dichromate, potassium permanganate, etc., are suitable, especially when added gradually over the reaction period. Thus, in accordance with this invention, the terpene is treated with ammonia and, at the same time, either with a fluid containing free oxygen or with a compound capable of liberating oxygen.

The ammonia required in the reaction may be supplied in the form of substantially anhydrous liquid or gaseous ammonia. Where gaseous ammonia is utilized, the reaction is preferably conducted under appreciable pressure thereof. A somewhat more convenient method of providing ammonia consists in adding an aqueous solution of ammonium hydroxide to the terpene being reacted upon. Preferably, strong aqueous ammonia is utilized. The presence of water is desirable; particularly it aids in the formation of water-soluble hydroxy amines derived from the terpene utilized. In general, the greater the proportion of water with respect to the ammonia, the greater will be the ratio of hydroxyl groups to amino groups introduced into the product. Thus the ammonia will be in at least a 1% aqueous solution. It will be in excess of that expected to combine.

The reaction in accordance with this invention is brought about by mixing the terpene in liquid phase with the ammonia and bringing this mixture into intimate contact with oxygen. This may be accomplished by vigorous agitation of liquid reactants to provide a maximum surface exposed to the oxygen. Preferably, air or pure oxygen is whipped up into the liquid or is bubbled through the liquid reactants. Where air is bubbled through the reactants, ammonia removed is preferably replaced. The reaction is greatly facilitated by providing the oxygen under superatmospheric pressure. Thus, air at any convenient pressure may supply the oxygen, the speed of the reaction increasing as the pressure is increased. Pressures up to several thousand atmospheres may be utilized, the actual pressure usually 5–100 atmospheres, being dictated largely by convenience.

The reaction may be conducted at any temperature in the range between about −40° and about 200° C., and preferably the temperature will be maintained between about 20° C. and about 80° C. Where freely water-soluble products are desired, or products high in tertiary hydroxyl content, the temperature is held between 0° and 100° C. Where oxygen is provided under conditions promoting rapid reaction, the temperature of the reaction mixture may rise rapidly, since the reaction is exothermic. It is frequently desirable to provide external cooling.

The time required to form hydroxyl-containing terpene amines by the method in accordance with this invention varies considerably with the conditions of reaction utilized. The methods of providing the oxygen required by the reaction largely determine the reaction time. Where the liquid reactants are merely agitated in air, or where air is slowly bubbled through a large mass of liquid reactants, the reaction time will usually be long, and may require as much as from 1 to 40 days for substantial completion. The time will be reduced as agitation is increased. Where the reaction is conducted under high oxygen pressure, or where the oxygen is immediately available through the addition of peroxides or other compounds capable of liberating oxygen rapidly, the reaction time may be as short as one hour. Utilizing oxygen under about 1,400 pounds per square inch air pressure, for example, substantial completion of reaction is obtained in about 6 to 8 hours.

Usually, the reaction mixture will consist essentially of the terpene and ammonia with the ammonia in excess of that expected to enter into the reaction. However, inert diluents such as, benzene, toluene, hexane, octane, ethyl ether, isopropyl ether, and the like may be present if desired.

The reaction may be facilitated if desired by the use of a hydration catalyst. Hydrohalides of basic nitrogen compounds, i. e., ammonia, substituted ammonia, and amines are effective. Thus ammonium chloride, ammonium bromide, ammonium iodide, ammonium fluoride, trimethyl benzyl ammonium chloride, diethyl dibenzyl ammonium chloride, and the like may be used. Similarly, hydrohalides, especially hydrochlorides of such amines as, for example, pyridine, toluidine, aniline, glycerol amine, monoethanolamine, diethanolamine, triethanolamine, hydroxylamine, methylamine and the like are suitable. The quantity of catalyst may vary from about 0.1% to about 25% by weight of the terpenic reactant present. Usually a quantity between about 0.5% and about 5% is suitable.

The reaction in accordance with this invention will usually be conducted until substantially no more oxygen is absorbed by the terpenic reactant. The reaction product will be a mixture containing hydroxy terpene amines of an oily nature insoluble in water and hydroxy terpene amines of a water-soluble nature. These products may be recovered from the reaction mixture by permitting the mixture to separate into two layers, separating the two layers, and recovering the products from associated volatile materials. Usually, it will be desirable to dilute the reaction mixture with water to insure formation of two layers. One will be a relatively dilute solution of ammonia and the water-soluble products of the reaction. The other layer will contain the water-insoluble components of the reaction product mixture.

The water-soluble products may be recovered from the lower layer by careful evaporation preferably at reduced pressure at as low a temperature as possible. This procedure removes water and excess ammonia, and leaves a viscous liquid containing a mixture of water-soluble hydroxylated terpene amines. Any catalyst which may crystallize out at this point is removed.

A crystalline product may be recovered where unsaturated terpene hydrocarbons or terpene alcohols have been reacted, by permitting the viscous liquid to stand for some time, usually 1–30 days, depending upon the temperature, and removing the resulting crystals by filtration. Low temperatures and seeding aid the crystallization. The crystalline product may also be recovered by the aid of solvents such as ethyl acetate, pyridine, ethyl ether, isopropyl ether, butanol, proponol, etc.

When a product of high purity is desired, the crystalline hydric amine may be recrystallized from water or any of the above solvents. Here again low temperatures are preferred to insure high yields. The mother liquors may be recovered and further treated to increase the yield of crystalline hydric amine.

The predominant crystalline product obtained in this manner is a white hydroxylated terpene amine having a capillary melting point of 160–170° C. A typical analysis of this product follows:

| | Per cent |
|---|---|
| Nitrogen | 7.1 |
| Carbon | 65.3 |
| Oxygen | 17.1 |
| Hydrogen | 10.4 |
| Hydroxyl—by dehydration | 10.5 |
| Hydroxyl—by acetylation (secondary) | 10.2 |

Usually a crude crystalline material of nearly the same general analysis but with a wide and indefinite melting range of 125°–170° C. is first obtained. This product is apparently a mixture of isomeric and/or similar hydric amines. Upon recrystallization from a solvent the product melting at 160°–170° C. is obtained.

The non-crystalline water-soluble product in the mother liquor resulting from the crystallization comprises one or more hydroxylated terpene amines. These include products with a lower degree of hydroxylation and amination, which are believed intermediate products of the completely hydroxylated-aminated products, and which may be further treated by recycling to increase their extent of reaction.

The oily layer separated from the reaction mixture contains water-insoluble hydroxylated terpene amines. These may be recovered by subjecting the oily layer to fractionation or steam distillation, preferably in vacuo, whereby unreacted terpenic compounds and volatile by-products are removed at the lowest possible temperature. The products obtained are characterized by a combined nitrogen content and by a content of secondary and/or tertiary hydroxyls. A typical raction product, for example, had a nitrogen content of 1.4% and a secondary hydroxyl content of 6.5%. These products are considered as largely intermediates of the water-soluble products and may be subjected to a repeated reaction if desired to increase the yield of water-soluble materials.

The water-soluble product and water-insoluble products obtained by the method in accordance with this invention are terpene amines having one or more hydroxyls upon the terpenic portion of the molecule. It is characteristic of these products that they have a combined nitrogen content between about 1 and about 14%, and a content of hydroxyl groups between about 1 and about 25% by weight (7–14% nitrogen and 10–25% hydroxyl in purified form), the hydroxyls being tertiary or secondary or both. The water-soluble product in general tends to have a higher hydroxyl content than the water-insoluble product. Both water-soluble and water-insoluble products are believed to consist of a mixture of rather similar compounds which differ from each other in part by degree of oxidation or hydroxylation and amination and in part by isomerization. It is believed that the addition of hydroxyl and amine groups is not entirely uniform, so that several isomers may be obtained from the same terpene. In addition, isomerization of the terpene structure usually takes place to some extent.

The exact mechanism of the reaction in the method according to this invention is not known. The reactions involve substantial increase in molecular weight of the terpene and are therefore essentially of the nature of addition reactions. No appreciable scission of the terpene or cracking is known to take place, although isomerization of the terpenic structure may occur. It is believed the following equations express at least approximately the nature of the reaction occurring when, for example, a terpene hydrocarbon is reacted with oxygen and ammonia:

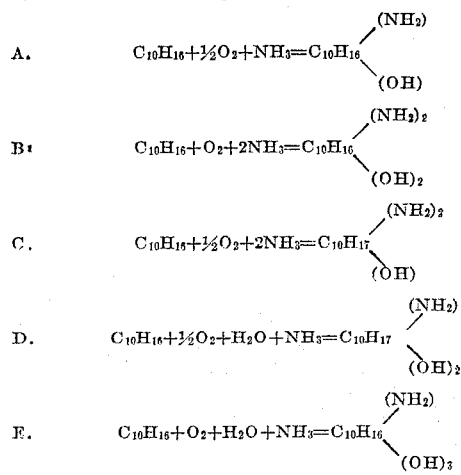

Reactions D and E appear most important in forming water-soluble products.

The process and product in accordance with this invention are illustrated by the specific embodiments thereof in the following examples. All parts and percentages are by weight unless otherwise specified.

*Example I*

A stream of air was bubbled through a mixture of 1,000 milliliters of terpinolene, 300 milliliters of concentrated equeous ammonia (29% ammonium hydroxide), and 200 milliliters of water contained in a flask, for a period of 300 hours while agitating the mixture. An exothermic reaction took place since the temperature of the mixture rose from room temperature to about 45° C. At the end of the reaction period the resulting mixture was permitted to separate into an oily and an aqueous layer, and the two layers were separated. The oily layer was washed with two 200-milliliter portions of water, and the washes were combined with the aqueous layer. Water was removed from the aqueous solution by evaporation at about 50° C. at an absolute pressure of about 20 mm. The resulting water-soluble residue was a hydroxylated terpene amine product dark in color, of a viscous oily nature, and having an analysis of 5.8% of combined nitrogen. A yield of 210 grams of this product was obtained.

80 grams of this crude hydric amine prepared was heated with 150 grams of ethyl acetate, cooled to room temperature and allowed to crystallize. As a result there were recovered 12 grams of pale yellow crystalline product. The mother liquor was cooled to about 5° C. whereby an additional 10 grams of crystalline product was obtained. The combined crystalline products analyzed as follows:

Hydroxyl by acetylation (secondary)_____per cent__ 10.2
Nitrogen _____do____ 7.12
Carbon _____do____ 65.3
Hydrogen _____do____ 10.4
Oxygen _____do____ 17.1
Melting point _____° C__ 126–168

When this product was recrystallized, it melted at 160–170° C.

The water-insoluble layer was steam distilled under an absolute pressure of about 20 mm. to remove volatile materials. About 500 milliliters of volatile oil were removed in this manner. The non-volatile residue consisted of 174 grams of a dark red oil analyzing 0.6% nitrogen, 1.0 tertiary hydroxyl, and 5.5 secondary hydroxyl.

*Example II*

A stream of air was blown through a mixture consisting of 1,000 milliliters of terpinolene, 50 milliliters of concentrated aqueous ammonia (29% ammonium hydroxide), and 300 milliliters of water contained in a flask for a period of 150 hours with agitation of the mixture. During the reaction period, 250 milliliters of 30% hydrogen peroxide were added dropwise. Two hundred and fifty milliliters of additional ammonium hydroxide solution were added in 50-milliliter portions at regular intervals during the reaction. At the end of the reaction period, the resulting aqueous and oily layers were separated, and the non-volatile components recovered in the same manner as described in Example I. A yield of 292 grams of dark colored, viscous, water-soluble hydroxylated terpene amine product analyzing 4.4% combined nitrogen was obtained.

*Example III*

A stream of air was passed through a mixture consisting of 1,000 milliliters of crude terpinolene, 300 milliliters of concentrated aqueous ammonia (29% ammonium hydroxide), and 200 milliliters of water contained in a flask for a period of 59 hours while agitating the mixture. The reaction which took place was exothermic in nature. At the end of the reaction period, the oily and aqueous layers which resulted were separated. The water layer was evaporated in vacuo to obtain as the residue a dark red, viscous, hydroxylated terpene amine product in a yield of 28 grams.

*Example IV*

In this example the reactants and conditions of reaction of Example III were exactly duplicated except that 10 grams of ammonium chloride were included in the reaction mixture to act as a catalyst. Evaporation of the resulting water layer in this case gave 56 grams of a dark red, viscous, hydroxylated terpene amine, the weight including the 10 grams of catalyst. Thus, the inclusion of the ammonium chloride catalyst increased the yield by about 65% as compared with Example III.

Example V

A stream of air was passed through a mixture consisting of 1,000 milliliters of dipentene, 300 milliliters of concentrated aqueous ammonia (29% ammonium hydroxide), and 200 milliliters of water contained in a flask for a period of 150 hours while agitating the mixture. An exothermic reaction took place. At the end of the reaction period, two layers were permitted to form and the non-volatile contents thereof were recovered in the manner described in Example I. The product obtained by evaporation of the aqueous portion analyzed 4.5% combined nitrogen.

Example VI

An autoclave was charged with 500 milliliters of terpinolene, 150 milliliters of concentrated aqueous ammonia (29% ammonium hydroxide), 100 milliliters of water, and oxygen at a pressure of 50–100 pounds per square inch. The temperature of the autoclave was raised to about 50° C., and the autoclave was vigorously shaken to provide agitation of the contents. An exothermic reaction took place, which appeared to be substantially complete in about 7 hours. After 8 hours, the contents of the autoclave were removed and permitted to separate into an oily layer and an aqueous layer. The aqueous layer was evaporated at about 50° C. under an absolute pressure of about 20 mm., and in this manner yielded as a residue 133 grams of a dark colored, viscous oil containing 6.8% of combined nitrogen.

A nearly-white crystalline product was obtained by the double crystallization procedure of Example I. Its melting point was 160–170° C. and its analysis was substantially the same as the Example I product.

The water-insoluble layer was steam distilled at reduced pressure to remove 134 milliliters of volatile oil. The residual product consisted of 124 grams of a viscous, oily material which analyzed 1.4% combined nitrogen, 6.5% secondary hydroxyl, and no tertiary hydroxyl.

Example VII

An autoclave was charged with 500 milliliters of terpinolene, 150 milliliters of concentrated aqueous ammonia (29% ammonium hydroxide), 100 milliliters of water, 5 grams of ammonium chloride as a catalyst, and compressed air to a pressure of 1,500 pounds per square inch. The temperature of the autoclave was raised to 50° C., and the autoclave was vigorously shaken to provide agitation of the contents. An exothermic reaction took place, and was complete in 4 to 5 hours. At the end of 5 hours, the reaction products were removed from the autoclave and permitted to separate into an oily layer and an aqueous layer.

The aqueous layer was evaporated at a temperature of 50° C. under reduced pressure, and in this manner the residual hydroxylated terpene amine in the form of a dark, viscous oil analyzing 7.1% combined nitrogen was obtained in a yield of 173 grams. The water-isoluble layer was treated in the manner of the previous example to recover its non-volatile hydroxylated terpene amine.

Example VIII

An autoclave was charged with 500 milliliters of dipentene, 150 milliliters of concentrated aqueous ammonia (29% ammonium hydroxide), 100 milliliters of water, and air at a pressure of 100 pounds per square inch. The reaction and recovery operations were conducted as in the previous example. The aqueous layer resulting from the reaction yielded 20 grams of a non-volatile, dark, viscous residue which analyzed 4.4% combined nitrogen.

Example IX

An autoclave was charged with 500 milliliters of dipentene, 150 milliliters of concentrated aqueous ammonia (29% ammonium hydroxide), 100 millimeters of water, 5 grams of ammonium chloride as catalyst, and air at a pressure of 200 pounds per square inch. The reaction and recovery conditions of the previous example were closely duplicated. In this case, evaporation of the resulting aqueous layer gave a yield of 43 grams of residual dark, viscous, hydroxylated terpene amine product having a content of 7.6% combined nitrogen.

Example X

An autoclave was charged with 500 milliliters of a terpene hydrocarbon cut obtained from pine wood and boiling in the range of 165–185° C., 150 milliliters of concentrated aqueous ammonia (29% ammonium hydroxide), 100 milliliters of water, and air at a pressure of 500 pounds per square inch. The reaction and recovery procedures were carried out in the manner described in Example VII. Evaporation of the aqueous layer resulting from the reaction gave a residue of 153 grams of dark colored, viscous, hydroxylated terpene amines containing 7.2% combined nitrogen.

Example XI

An autoclave was charged with 500 milliliters of a mixture containing 40% of allo-ocimene and 60% of monocyclic terpenes, 150 milliliters of concentrated aqueous ammonia (29% ammonium hydroxide), 100 milliliters of water, and air at a pressure of 300 pounds per square inch. The reaction and recovery procedures were the same as those described in Example VII. Evaporation of the aqueous layer resulting from the reaction yielded as a residue 114 grams of a dark, viscous, hydroxylated terpene amine analyzing 10.3% combined nitrogen.

The crude hydric amine prepared from allo-ocimene (100 grams) was dissolved in 200 grams ethyl acetate by warming, cooled to 0° C. and allowed to crystallize. The crystallized product was recovered by filtration whereby 31 grams of pale yellow crystalline hydric amine were recovered. This product analyzed 7.2% nitrogen and had a melting point of 160–170° C.

Example XII

A mixture consisting of 500 milliliters of mixed alpha- and beta-pyronenes, 150 milliliters of aqueous ammonia (25% ammonium hydroxide), 150 milliliters of water and air at a pressure of 250 lbs. per square inch was charged into an autoclave and agitated at a temperature of 35–40° C. for 8 hours. Crude reaction mixture was then removed from the autoclave and permitted to separate into two layers. The aqueous layer was evaporated over a steam bath at a temperature of about 65° C. and an absolute pressure of 5 centimeters of mercury. In this manner, 130 grams of dark viscous hydroxylated terpene amine product were recovered from the water solution.

*Example XIII*

Five hundred milliliters of myrcene, 150 milliliters of aqueous ammonia (ammonium hydroxide), 150 milliliters of water and air at a pressure of 250 lbs. per square inch were charged into an autoclave and agitated at 40° C. for 8 hours. The reaction mixture was removed from the autoclave and permitted to separate into two layers. The aqueous layer was evaporated as in the previous example to yield 110 grams of a deep amber, viscous hydroxylated terpene amine product. The oily layer was steam distilled to yield as a residue an oily amber, viscous hydroxylated terpene amine product of relatively low nitrogen content.

Tertiary alcohol content as used herein is determined by dehydration under the influence of sodium acid sulfate as a catalyst, measuring the water and any alcohol evolved as indicative of tertiary hydroxyl. Secondary alcohol content is determined by acetylation of the dehydrated residue from the tertiary alcohol determination, followed by saponification, then determining the saponification number in the usual manner and calculating the secondary alcohol content therefrom. Results expressed as alcohol content are calculated on the monohydric alcohol basis assuming the formula $C_{10}H_{17}OH$.

The products made according to this invention are useful as solvents and as flotation agents. The water-soluble products furnish excellent coupling agents between water-soluble and water-insoluble material of an organic nature. The water-insoluble products are useful as solvents in paints and cellulose derivative lacquers, and they also find use as detergent aids.

It will be understood that the details and examples hereinbefore set forth are illustrative only and that the invention as broadly described and claimed is in no way limited thereby.

What I claim and desire to protect by Letters Patent is:

1. A method which comprises subjecting a mixture of an unsaturated terpene and ammonia to reaction with free oxygen until a hydroxylated terpene amine is produced.

2. A method which comprises subjecting a mixture of an unsaturated terpene hydrocarbon and ammonia to reaction with free oxygen until a hydroxylated terpene amine is produced.

3. A method which comprises agitating an unsaturated terpene hydrocarbon and ammonia in the presence of a gas containing free oxygen until a hydroxylated terpene amine is produced, and recovering the said amine.

4. A method which comprises agitating an unsaturated terpene hydrocarbon and ammonia in the presence of a gas containing free oxygen until a freely water-soluble hydroxylated terpene amine is produced, and recovering the said amine.

5. A method which comprises reacting a mixture of an unsaturated terpene and ammonia with free oxygen, the free oxygen being contained in a gas under superatmospheric pressure, until a hydroxylated terpene amine is produced.

6. A method which comprises subjecting a mixture of an unsaturated terpene, ammonia, and a hydration catalyst to reaction with free oxygen until a hydroxylated terpene amine is produced.

7. A method which comprises subjecting a mixture of an unsaturated terpene, ammonia, and a hydration catalyst to reaction with a gas containing free oxygen until a water-soluble hydroxylated terpene amine is produced, and recovering the water-soluble hydroxylated terpene amine.

8. A method which comprises subjecting a mixture of an unsaturated terpene, ammonia, and water to reaction with free oxygen until a hydroxylated terpene amine is produced.

9. A method which comprises subjecting a mixture of an unsaturated terpene hydrocarbon, ammonia, and water to reaction with free oxygen until a hydroxylated terpene amine is produced.

10. A method which comprises subjecting a mixture of an unsaturated terpene hydrocarbon, ammonia, and water to reaction with a gas containing free oxygen until a water-soluble hydroxylated terpene amine is produced, and recovering the water-soluble amine.

11. A method which comprises subjecting a mixture of an unsaturated terpene hydrocarbon and ammonia to reaction with free oxygen under superatmospheric pressure in the presence of a hydration catalyst until a hydroxylated terpene amine is produced.

12. A method which comprises subjecting a mixture of an unsaturated terpene hydrocarbon, ammonia, and water to reaction with air under superatmospheric pressure in the presence of a hydration catalyst until a water-soluble hydroxylated terpene amine is produced, and recovering the said water-soluble hydroxylated terpene amine.

13. A method which comprises subjecting a mixture of dipentene and ammonia to reaction with oxygen until a hydroxylated terpene amine is produced.

14. A method which comprises subjecting a mixture of allo-ocimene and ammonia to reaction with oxygen until a hydroxylated terpene amine is produced.

15. A method which comprises subjecting a mixture of myrcene and ammonia to reaction with oxygen until a hydroxylated terpene amine is produced.

16. A water-soluble hydroxylated terpene amine product characterized by a nitrogen content of about 7–14% and a hydroxyl content of about 10–25%, said product being formed by the reaction of an unsaturated terpene with ammonia and free oxygen until the water-soluble hydroxylated terpene amine is formed in the reaction mixture, and recovering the said product from the mixture.

17. A water-soluble crystalline hydroxylated terpene amine product characterized by a nitrogen content of about 7–14% and a hydroxyl content of about 10–25%, the product being formed by reacting an unsaturated terpene with ammonia and free oxygen until a water-soluble hydroxylated terpene amine is formed in the reaction mixture, separating the water-soluble material from the mixture, and crystallizing the said crystalline product therefrom.

18. A water-soluble hydroxylated terpene amine product characterized by a nitrogen content of about 7–14% and a hydroxyl content of about 10–25%, said product being formed by the reaction of dipentene with ammonia and free oxygen until the water-soluble hydroxylated terpene amine is formed in the reaction mixture, and recovering the said product from the mixture.

19. A water-soluble hydroxylated terpene amine product characterized by a nitrogen content of about 7-14% and a hydroxyl content of about 10-25%, said product being formed by the reaction of allo-ocimene with ammonia and free oxygen until the water-soluble hydroxylated terpene amine is formed in the reaction mixture, and recovering the said product from the mixture.

20. A water-soluble hydroxylated terpene amine product characterized by a nitrogen content of about 7-14% and a hydroxyl content of about 10-25%, said product being formed by the reaction of myrcene with ammonia and free oxygen until the water-soluble hydroxylated terpene amine is formed in the reaction mixture, and recovering the said product from the mixture.

JOSEPH N. BORGLIN.